G. WAMHOFF, Jr.
LAMP GLASS.
APPLICATION FILED AUG. 27, 1909.
973,729.
Patented Oct. 25, 1910.
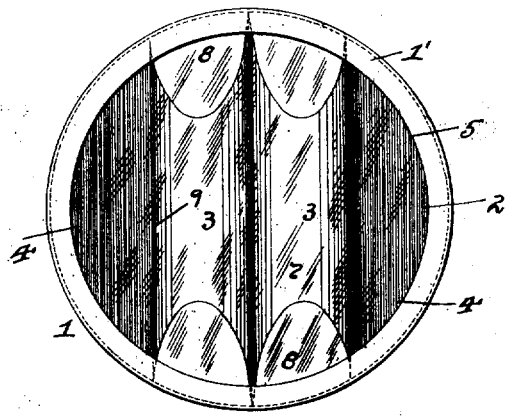
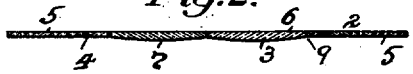
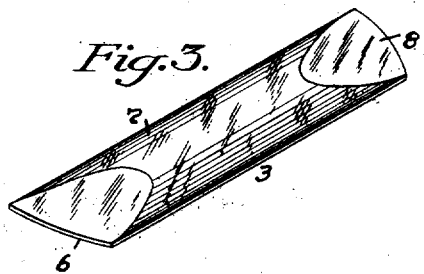
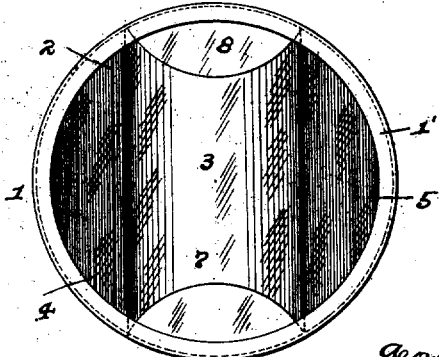
WITNESSES
O. L. Thompson
James L. Wehn
INVENTOR
George Wamhoff Jr.
By J. N. Cooke
Attorney

UNITED STATES PATENT OFFICE.

GEORGE WAMHOFF, JR., OF PITTSBURG, PENNSYLVANIA, ASSIGNOR, BY MESNE ASSIGNMENTS, TO MA-BELLE S. WAMHOFF, OF PITTSBURG, PENNSYLVANIA.

LAMP-GLASS.

973,729.  Specification of Letters Patent.  Patented Oct. 25, 1910.

Application filed August 27, 1909. Serial No. 514,909.

*To all whom it may concern:*

Be it known that I, GEORGE WAMHOFF, Jr., a resident of Pittsburg, in the county of Allegheny and State of Pennsylvania, have invented a new and useful Improvement in Lamp-Glasses; and I do hereby declare the following to be a full, clear, and exact description thereof.

My invention relates to lamp glasses, and has special reference to such glasses or lenses that are used on flat faced lamps, such as the acetylene type, for automobiles, etc.

The object of my invention is to provide a cheap, simple and efficient lamp glass or lens which can easily and quickly be applied to the ordinary approved form of lamps, and will enable a greater spreading and diffusion of the light from the lamp and through the same than the ordinary glasses or lenses generally employed.

My invention consists, generally stated, in the novel arrangement, construction and combination of parts as hereinafter more specifically set forth and described and particularly pointed out in the claims.

To enable others skilled in the art to which my invention appertains to construct and use my improved lamp glass or lens, I will describe the same more fully, referring to the accompanying drawing, in which—

Figure 1 is a face view of my improved lamp glass applied to the ordinary form of lamp. Fig. 2 is a cross-section of the same. Fig. 3 is a perspective view of one of the intermediate parts or sections of the glass or lens. Fig. 4 is a face view of another form of my invention.

Like symbols of reference herein indicate like parts in each of the figures of the drawing.

As illustrated in the drawing, 1 represents the usual circular rim of an ordinary lamp, such as the acetylene type, used on automobiles, and 2 is the circular lamp glass supported therein. The lamp glass 2 is formed of a series of lenses or sections, which are set in vertical line in the rim 1 and held therein in any suitable manner and against the face 1' of said rim through the usual connections on the periphery of such glass. The lamp glass 2 is composed of the two intermediate dispersing sections 3 of clear glass and the outer diffusing section 4 of ground glass on each side of such intermediate sections. The outer ground glass sections 4 are provided with flat faces 5 on both sides and the intermediate clear glass sections 3 are provided with flat rear faces 6 and convex front faces 7 in cross-section, which are flattened or beveled at their upper and lower ends, as at 8, in order to fit against the face 1' of the rim 1 and be secured thereto. Between the sections 3 and 4 of the lamp glass 2 a crack or opening of sufficient size is left at their adjacent side edges, as at 9, to allow the entrance of air through the same and into the lamp.

If desired, the lamp glass 2 can be provided with more than two intermediate sections 3 of clear glass, or a single intermediate section, such as is shown in Fig. 4, and such lenses or sections arranged in a horizontal line, while various other modifications and changes in the design and construction of my improved lamp glass may be resorted to, without departing from the spirit of the invention or sacrificing any of its advantages.

It will thus be seen that my improved lamp glass will furnish a search-light of unusual power, will present a neat and finished appearance to the lamps on which it is employed, and will add greatly to the lighting power of the same. Practical experience with the glass has demonstrated that it will spread or disperse the light from the lamp over a greater area, as well as diffuse the same, and will enable the light to be reflected through the same in a clearer and brighter condition than in the ordinary forms now in use. The glass can be used for a variety of lamps employing gas, acetylene, etc., as a lighting agent and for a variety of uses and purposes, such as on automobiles, street cars, etc.

What I claim as my invention and desire to secure by Letters Patent is—

1. A lamp glass comprising an intermediate vertical section of clear rounded glass and an outer vertical section of flat ground glass on the side of the same.

2. A lamp glass comprising an intermediate vertical section of clear glass having a convex outer face in cross-section and an outer vertical section of ground glass on the side of the same.

3. In a lamp glass, the combination with a supporting rim, of an intermediate vertical section of clear glass having a convex outer face in cross-section and beveled ends for fitting against said rim, and an outer vertical section of ground glass on the side of said lenses.

In testimony whereof, I, the said GEORGE WAMHOFF, Jr., have hereunto set my hand.

GEORGE WAMHOFF, JR.

Witnesses:
J. N. COOKE,
JAMES L. WEHN.